United States Patent Office 3,535,390
Patented Oct. 20, 1970

3,535,390
NITROADAMANTANES
Gary L. Driscoll, Boothwyn, Pa., assignor to Sun Oil Company, Philadelphia, Pa., a corporation of New Jersey
No Drawing. Filed Mar. 26, 1968, Ser. No. 715,959
Int. Cl. C07c 79/08
U.S. Cl. 260—644                    4 Claims

ABSTRACT OF THE DISCLOSURE 1-nitro and 1,3-dinitro adamantanes and alkyladamantanes are produced by reacting hydrogen peroxide with a 1-amino or 1,3-diamino adamantane or alkyladamantane in the presence of an alkali metal tungstate as catalyst.

BACKGROUND OF THE INVENTION

The cage-like structure of the admantane nucleus has been illustrated in several ways, of which the following is one example:

As can be seen, it consists of three condensed cyclohexane rings arranged so that there are four bridgehead carbon atoms which are equivalent to each other.

The preparation of methyl- and/or ethyl-substituted adamantanes by the isomerization of tricyclic naphthenes by means of an aluminum halide or HF-BF₃ catalyst has been described in several references including the following: Schneider U.S. Pat. No. 3,128,316; Janoski et al. U.S. Pat. 3,275,700; Schleyer et al., Tetrahedron Letters No. 9, pp. 305–309 (1961); and Schneider et al., JACS, vol. 86, pp. 5365–5367 (1964). The isomerization products can have the methyl and/or ethyl groups attached to the adamantane nucleus at either bridgehead or non-bridgehead positions or both, although completion of the isomerization reaction favors bridgehead substitution. Examples of alkyladamantanes made by such isomerization are methyladamantanes; dimethyladamantanes; ethyladamantanes; methylethyladmanatanes; dimethylethyladamantanes; trimethyladamantanes and tetramethyladamantanes.

Preparation of adamantane hydrocarbons having higher alkyl groups has been disclosed by Spengler et al., Erdöl und Kohle-Erdgas-Petrochemie, vol. 15, pp. 702–707 (1962). These authors used a Wurtz synthesis involving the reaction of 1-bromoadamantanes with alkali metal alkyls to interchange the alkyl group for the bromine substituent. In this manner 1-n-butyladamantane and 1-n-hexyladamantane were prepared.

Recently Hoek et al., 85 (1966) Recueil 1045–1053, have described a different route for the preparation of butyl-substituted adamantane. The procedure involved reacting either 1-bromoadamantane or 2-bromoadamantane with thiophene using SnCl₄ as catalyst in the presence of excess thiophene as solvent to produce adamantyl thiophenes and then hydrogenating the admanatyl thiophenes to yield butyl-substituted adamantanes.

The preparation of bridgehead monohydroxy and dihydroxy derivatives of adamantane and alkyladamantanes is known. See, for example, Schneider U.S. Pat. Nos. 3,356,740 and 3,356,741.

Bridgehead diamino derivatives of adamantane and alkyladamantanes can be prepared from the corresponding dihydroxyadamantane compounds in the manner described in Moore U.S. application Ser. No. 510,353, filed Nov. 29, 1965, now U.S. Pat. No. 3,419,611. This involves reacting the 1,3-dihydroxyadamantane compound in fuming sulfuric acid (e.g., 102% H₂SO₄) with hydrogen cyanide, diluting the reaction mixture with water (e.g., to an H₂SO₄ content of 40%) whereby the corresponding 1,3-diformamidoadamantane compound forms in solution, and then refluxing the mixture until the 1,3-diformamido compound has hydrolyzed to the 1,3-diamino derivative. Monoamino derivatives of adamantane and alkyladamantanes can be prepared in analogous fashion by starting with monohydroxyadamantane compounds in place of the dihydroxy derivatives.

SUMMARY OF THE INVENTION

The invention resides in a process for the production of compounds having the formula:

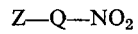

wherein Q represents a hydrocarbon moiety consisting of the adamantane nucleus with 0–3 alkyl substituents containing a total of not more than 20 alkyl carbon atoms; wherein NO₂ is a bridgehead nitro group; and wherein Z is a bridgehead substituent from the group consisting of hydrogen, alkyl having 1–10 carbon atoms, and NO₂, remaining substituents on Q being hydrogen, which comprises reacting hydrogen peroxide, in the presence of an alkali metal tungstate as catalyst, with a compound having the formula:

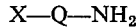

wherein Q has the same meaning as above; wherein NH₂ is a bridgehead substituent; and wherein X is a bridgehead substituent from the group consisting of hydrogen, alkyl having 1–10 carbon atoms, and NH₂, remaining substituents on Q being hydrogen.

Thus the hydrocarbon moiety Q can correspond to adamantane, or to an alkyladamantane having 1–3 alkyl groups and 11–30 carbon atoms (1–20 total alkyl carbon atoms). Preferably Q has a total of 0–10 alkyl carbon atoms. The alkyl group or groups can be attached to the adamantane nucleus at either bridgehead or non-bridgehead positions or both. Also preferably, an alkyl group contains no more than 5 carbon atoms.

From the foregoing it can be seen that a compound corresponding to the above two formulas can contain 0–30 alkyl carbon atoms, for a total in said compound of 10–40 carbon atoms.

DESCRIPTION OF THE INVENTION

Examples of amino starting material and products according to the present invention are the relevant mono- and di-bridgehead derivatives of the following hydrocarbons:

adamantane;
1-methyl or 2-methyladamantane;
1-ethyl or 2-ethyladamantane;
1,2-dimethyl or 1,3-dimethyladamantane;
1,3,4-trimethyl or 1,3,6-trimethyl or 1,2,6-trimethyladamantane;
1-methyl-3-ethyladamantane;
diethyladamantanes;
1-n-propyl or 1-isopropyladamantane;
1-n-butyladamantane;
1,3-di-n-pentyladamantane;
1-methyl-3-heptyladamantane;
1-n-decyladamantane;
1-n-decyl-3-ethyladamantane;
1-methyl-2-propyladamantane;

1-iso-hexyladamantane;
1,2-dimethyl-5-octyladamantane;
1-dodecyladamantane;
1-eicosyladamantane;

and the like.

Preferred amino reactants are 1,3-diamino-5,7-dialkyladamantanes having not more than 10 total carbon atoms in the two alkyl groups and still more preferably in which the alkyl groups are methyl and/or ethyl.

The mononitro and dinitro adamantane derivatives prepared by the present invention are useful as fuels or fuel components for jet aircraft and rockets as disclosed in Schneider U.S. Pat. 3,258,498. The mononitro derivatives of the lower alkyladamantanes generally are liquids and can be used alone as fuel or in admixture with hydrocarbon fuels such as kerosine or light gas oil. The dinitro adamantane derivatives are normally crystalline solids and can be employed in admixture with suitable oxidants, such as ammonium nitrate or potassium perchlorate, as solid fuels for rockets, or they can also be utilized in solution in liquid hydrocarbon fuels.

The oxidizing agent for effecting conversions according to the invention is aqueous hydrogen peroxide promoted by means of a catalyst which is an alkali metal tungstate. The aqueous hydrogen peroxide employed can vary widely in hydrogen peroxide content, e.g., 3–90% $H_2O_2$ by weight, more preferably 10–40%. The catalyst can be the tungstate of any of the alkali metals, with sodium and potassium tungstates being preferred.

In a typical reaction 1,3-diamino-5,7-dimethyladamantane and sodium tungstate are dissolved in water prior to or after being charged to a closed container to which is then added aqueous hydrogen peroxide with stirring, such addition being made in increments or as a single charge. The hydrogen peroxide is used in adequate amount to oxidize both amino groups in the starting material in the manner shown by the equation presented hereinafter.

The rate of reaction is a function of temperature, the reaction proceeding relatively slower at room temperature, and relatively faster with increase in temperature.

For practical purposes, temperature conditions in the zone of reaction ought to be sufficiently high for the reaction to take place at a reasonable rate, and not so high as to cause unwanted or excessive decompostion, or excessive production of by-products. A preferred temperature range is 20–150° C.

The product, a solid, is separated from the reaction mass by filtration, and in its crude form is blue, green or greenish-blue. Purification can be carried out by dissolving the crude product in a suitable solvent, e.g., an ester, ether or ketone, followed by recrystallization to yield a white solid of high purity. Evidence indicates that the color present in the crude product is caused by the presence of a minor amount of nitroso intermediate or intermediates containing one or more —N=O groups.

The reaction can be illustrated by an equation as follows:

In this typical reaction the product is 1,3-dinitro-5,7-dimethyladamantane. In analogous manner, by starting with a monoamino adamantane compound the corresponding mononitro derivative can be prepared. In all these reactions in which one or two amino groups on the adamantane nucleus are oxidized to nitro groups by means of hydrogen peroxide, no oxidation occurs at other sites in the molecule either in the alkyl groups or on the nucleus.

Similar results are obtained when no alkyl substituents are present, when alkyl substituents are 1–4 in number and occupy bridgehead or nonbridgehead positions, or both, and when the alkyl substituents, taken individually, contain one or more than one carbon atoms. The alkyl substituents when present thus can be the same or different, to yield products correspondingly alkyl substituted.

The following examples are given by way of illustration:

EXAMPLE I 3.9 grams (.02 mole) of 1,3-diamino-5,7-dimethyladamantane and 0.10 gram of sodium tungstate were dissolved in 10 ml. of water and charged to a closed container. To this were added with stirring 20 ml. of 30% aqueous hydrogen peroxide. The mixture was allowed to stand for 5 days at room temperature during which time periodic additions of 1 ml. portions of 30% aqueous hydrogen peroxide were made (with stirring) for an additional total of 20 ml. Filtration yielded a blue-colored solid. Upon solution of the crude product in a hexane-ethyl acetate mixture and recrystallization a white solid was obtained.

A sample separated by vapor phase chromatography was found by infrared, nuclear magnetic resonance, and mass spectroscopy to be 1,3-dinitro-5,7-dimethyladamantane.

The crude yield was 3.5 grams, 69% of theory.

EXAMPLE II 3.9 grams (.02 mole) of 1,3-diamino-5,7-dimethyladamantane and 0.10 gram of sodium tungstate were added to 40 ml. of 30% aqueous hydrogen peroxide in a closed container with stirring. The reaction mass was then heated to 70° C. for 14 hours. The mass upon cooling was subjected to filtration to recover 3.9 grams of a green solid, identified as mainly 1,3-dinitro-5,7-dimethyladamantane (yield=77% of theory).

When other amino compounds of the formula herein defined are substituted for 1,3-diamino-5,7-dimethyladamantane, substantially similar results are obtained.

A surprising feature of the invention is the facility with which —NH₂ groups are oxidized to —NO₂ groups, a reaction which normally is very difficult to carry out. Another surprising feature of the invention is that a final reaction mass is obtained in which the desired product is present in relatively high yield, and from which it can be separated with relative ease.

I claim:

1. A process which comprises reacting hydrogen peroxide in the presence of an alkali metal tungstate as catalyst with a compound of the formula:

$$X—Q—NH_2$$

wherein Q represents a hydrocarbon moiety consisting of the adamantane nucleus with 0–3 alkyl substituents containing a total of not more than 20 carbon atoms; wherein NH₂ is a bridgehead substituent; and wherein X is a bridgehead substituent from the group consisting of hydrogen, alkyl having 1–10 carbon atoms, and NH₂, remaining substituents on Q being hydrogen, thereby to form a corresponding nitro derivative of the formula:

$$Z—Q—NO_2$$

wherein Q is as previously specified; wherein NO₂ is a bridgehead nitro group, and wherein Z is a bridgehead substituent from the group consisting of hydrogen, alkyl having 1–10 carbon atoms, and $NO_2$.

2. The process of claim 1 wherein Q has 1–3 alkyl substituents containing a total of not more than 10 alkyl carbon atoms, and wherein X is $NH_2$.

3. The process of claim 2 wherein said alkyl substituents are two in number, each located at a bridgehead position and containing not more than 5 carbon atoms.

4. The process of claim 3 wherein each alkyl substituent is a methyl group.

References Cited
UNITED STATES PATENTS

| | | | |
|---|---|---|---|
| 3,053,907 | 9/1962 | Smith et al. | 260—644 |
| 3,211,785 | 10/1965 | Kilroy et al. | 260—644 XR |
| 3,377,387 | 4/1968 | Bachman et al. | 260—644 XR |

LELAND A. SEBASTIAN, Primary Examiner

U.S. Cl. X.R.

149—88